United States Patent
Choi et al.

(10) Patent No.: US 12,129,133 B2
(45) Date of Patent: Oct. 29, 2024

(54) GLASS TRANSPORTATION APPARATUS AND A SYSTEM FOR MANUFACTURING MULTI-PANE GLASS UNITS COMPRISING THE SAME

(71) Applicant: Corning Incorporated, Corning, NY (US)

(72) Inventors: Jae-Young Choi, Seoul (KR); Joon Hoi Kim, Yongin-Si (KR); Young-Ki Oh, Gwangju (KR); Cheolsoon Park, Suwon-Si (KR); JinWook Song, Seongnam (KR)

(73) Assignee: CORNING INCORPORATED, Corning, NY (US)

( * ) Notice: Subject to any disclaimer, the term of this patent is extended or adjusted under 35 U.S.C. 154(b) by 158 days.

(21) Appl. No.: 17/785,679

(22) PCT Filed: Dec. 9, 2020

(86) PCT No.: PCT/US2020/063866
§ 371 (c)(1),
(2) Date: Jun. 15, 2022

(87) PCT Pub. No.: WO2021/126609
PCT Pub. Date: Jun. 24, 2021

(65) Prior Publication Data
US 2023/0060067 A1 Feb. 23, 2023

(30) Foreign Application Priority Data
Dec. 18, 2019 (KR) .................. 10-2019-0170211

(51) Int. Cl.
B65G 49/06 (2006.01)
B65G 15/30 (2006.01)
(Continued)

(52) U.S. Cl.
CPC .......... *B65G 49/063* (2013.01); *B65G 15/30* (2013.01); *B65G 21/20* (2013.01);
(Continued)

(58) Field of Classification Search
None
See application file for complete search history.

(56) References Cited

U.S. PATENT DOCUMENTS 5,270,084 A 12/1993 Parker
5,332,080 A * 7/1994 Lenhardt ............. E06B 3/67365
156/107

(Continued)

FOREIGN PATENT DOCUMENTS

CN 102667044 A 9/2012
CN 104609744 A 5/2015
(Continued)

OTHER PUBLICATIONS

International Search Report and Written Opinion of the International Searching Authority; PCT/US2020/063866; mailed on Mar. 15, 2021, 09 pages; Korean Patent Office.

*Primary Examiner* — William R Harp
(74) *Attorney, Agent, or Firm* — Daniel J. Greenhalgh (57) ABSTRACT

Provided are a glass transportation apparatus and a system including the glass transportation apparatus for manufacturing a multi-pane glass unit. The glass transportation apparatus includes a plate including a main surface facing a main surface of a glass pane, a gas blowing device configured to blow a gas towards the main surface of the glass pane such that the main surface of the glass pane is spaced apart from the main surface of the plate, and a conveyer including a belt having an upper surface and a plurality of pulleys configured to circulate the belt.

20 Claims, 9 Drawing Sheets

(51) Int. Cl.
   *B65G 21/20* (2006.01)
   *B65G 43/08* (2006.01)
   *B65G 51/03* (2006.01)
   *E06B 3/673* (2006.01)

(52) U.S. Cl.
   CPC ......... *B65G 21/2054* (2013.01); *B65G 43/08* (2013.01); *B65G 51/03* (2013.01); *E06B 3/67365* (2013.01); *B65G 2201/022* (2013.01); *B65G 2812/02138* (2013.01); *E06B 3/67369* (2013.01)

(56) References Cited

U.S. PATENT DOCUMENTS

| | | | |
|---|---|---|---|
| 5,573,618 A | 11/1996 | Rueckheim | |
| 6,609,611 B1 | 8/2003 | Lenhardt | |
| 6,962,638 B2 | 11/2005 | Okino et al. | |
| 7,690,870 B2* | 4/2010 | Lisec | B65G 49/063 406/88 |
| 7,891,066 B2* | 2/2011 | Aoki | C03B 33/0207 134/122 R |
| 8,403,601 B2* | 3/2013 | Yano | H01L 21/67196 414/676 |
| 8,511,461 B2* | 8/2013 | Kudva | F16C 32/0603 65/25.2 |
| 9,567,793 B2 | 2/2017 | Mader | |
| 10,113,354 B2* | 10/2018 | Queck | E06B 3/67326 |
| 2012/0222373 A1 | 9/2012 | Bouesnard et al. | |
| 2012/0285605 A1 | 11/2012 | Ripoche et al. | |
| 2015/0275567 A1 | 10/2015 | Jun | |
| 2018/0044972 A1 | 2/2018 | Bauer et al. | |

FOREIGN PATENT DOCUMENTS

| | | |
|---|---|---|
| CN | 104797772 A | 7/2015 |
| DE | 4437998 A1 | 8/1995 |
| EP | 2963226 A1 | 1/2016 |
| EP | 3798402 A1 | 3/2021 |
| JP | 09-263428 A | 10/1997 |
| JP | 11-236251 A | 8/1999 |
| JP | 3581154 B2 | 10/2004 |
| JP | 2018-199452 A | 12/2018 |
| KR | 20-1995-0003262 Y1 | 4/1995 |
| KR | 10-0699028 B1 | 3/2007 |
| KR | 10-0828202 B1 | 5/2008 |
| KR | 10-2009-0035937 A | 4/2009 |
| KR | 10-2010-0058708 A | 6/2010 |
| KR | 10-2010-0067993 A | 6/2010 |
| KR | 10-2011-0038229 A | 4/2011 |
| KR | 10-2013-0091375 A | 8/2013 |
| KR | 10-1500683 B1 | 3/2015 |
| WO | 2010/115456 A1 | 10/2010 |
| WO | 2013/114302 A1 | 8/2013 |
| WO | 2014/168219 A1 | 10/2014 |
| WO | 2016/039382 A1 | 3/2016 |

* cited by examiner

GLASS TRANSPORTATION APPARATUS AND A SYSTEM FOR MANUFACTURING MULTI-PANE GLASS UNITS COMPRISING THE SAME

CROSS-REFERENCE TO RELATED APPLICATIONS

This application claims the benefit of priority under 35 U.S.C. § 371 of International Application No. PCT/US2020/063866, filed on Dec. 9, 2020, which claims the benefit of Korean Patent Application No. 10-2019-0170211, filed on Dec. 18, 2019, in the Korean Intellectual Property Office, the disclosure of each of which is incorporated herein in its entirety by reference.

BACKGROUND

1. Field

One or more embodiments relate to a glass transportation apparatus and a system for manufacturing a multi-pane glass unit, the system including the glass transportation apparatus. In particular, one or more embodiments relate to a glass transportation apparatus for transporting thin glass, and a system for manufacturing a multi-pane glass unit including thin glass.

2. Description of Related Art

A multi-pane glass unit including a plurality of glass panes may be efficient for heat insulation, soundproof, preventing dew condensation, etc. Such a multi-pane glass unit may be used in buildings, transportation means such as cars, trains, airplanes, etc., windows of electronic devices such as refrigerators or freezers. A system for manufacturing a multi-pane glass unit may include a plurality of processing apparatuses (for example, a cutting apparatus, a washing apparatus, a spacer attaching apparatus, a pressing apparatus, and a sealing apparatus) and a glass transportation apparatus for transporting glass panes between the plurality of processing apparatuses.

SUMMARY

One or more embodiments include a glass transportation apparatus capable of preventing damage, breaking, and/or falling down of glass, and a system for manufacturing a multi-pane glass unit, the system including the glass transportation apparatus.

Additional aspects will be set forth in part in the description which follows and, in part, will be apparent from the description, or may be learned by practice of the presented embodiments of the disclosure.

According to one or more embodiments, a glass transportation apparatus includes a plate including a main surface facing a main surface of a glass pane, a gas blowing device configured to blow a gas towards the main surface of the glass pane such that the main surface of the glass pane is spaced apart from the main surface of the plate, and a conveyer including a belt having an upper surface and a plurality of pulleys configured to circulate the belt, the upper surface of the belt being perpendicular to the main surface of the plate and configured to be in contact with an edge surface of the glass pane, wherein a flow rate of the gas blown by the gas blowing device is adjusted to be a first flow rate when the glass pane is an outer glass pane, and the flow rate of the gas blown by the gas blowing device is adjusted to be a second flow rate when the glass pane is an inner glass pane that is thinner than the outer glass pane, the second flow rate being less than the first flow rate.

In some embodiments, the glass transportation apparatus may further include a sensor configured to sense the glass pane fed into the glass transportation apparatus.

In some embodiments, the flow rate may be adjusted according to an order of feeding the glass panes into the glass transportation apparatus.

In some embodiments, the glass transportation apparatus may not include a wheel configured to be in contact with the main surface of the glass pane.

In some embodiments, the belt may include a base portion having the upper surface that is flat, and a protrusion protruding from the upper surface of the base portion and configured to be in contact with the main surface of the glass pane.

In some embodiments, the glass transportation apparatus may further include a side conveyer including a belt and a plurality of pulleys for circulating the belt, the belt configured to be in contact with the main surface of the glass pane.

In some embodiments, the main surface of the plate may be inclined about 8° to about 14° with respect to a gravity direction.

According to one or more embodiments, a glass transportation apparatus includes a plate including a main surface facing a main surface of a glass pane, a gas blowing device configured to blow a gas towards the main surface of the glass pane such that the main surface of the glass pane is spaced apart from the main surface of the plate, a conveyer including a belt having an upper surface and a plurality of pulleys configured to circulate the belt, the upper surface of the belt being perpendicular to the main surface of the plate and configured to be in contact with an edge surface of the glass pane, and an angle adjustment device configured to adjust an angle between the main surface of the plate and a gravity direction, wherein the angle between the main surface of the plate and the gravity direction is adjusted to be a first angle when the glass pane is an outer glass pane, and the angle between the main surface of the plate and the gravity direction is adjusted to be a second angle when the glass pane is an inner glass pane that is thinner than the outer glass pane, the second angle being greater than the first angle.

In some embodiments, the angle may be adjusted according to an order of feeding the glass panes into the glass transportation apparatus.

In some embodiments, the first angle may be about 5° to about 8°, and the second angle may be about 8° to about 14°.

According to one or more embodiments, a glass transportation apparatus includes a plate including a main surface facing a main surface of a glass pane, a first conveyer including a first belt having an upper surface and a plurality of first pulleys configured to circulate the first belt, the upper surface of the first belt being provided to be in contact with an edge surface of the glass pane, and a second conveyer including a second belt having an upper surface and a plurality of second pulleys configured to circulate the second belt, the upper surface of the second belt configured to be in contact with the main surface of the glass pane.

In some embodiments, the transportation speed of the first conveyer may be equal to a transportation speed of the second conveyer.

In some embodiments, the first conveyer and the second conveyer may each include a timing belt.

In some embodiments, the second conveyer may be located between the first conveyer and the plate.

In some embodiments, the upper surface of the first belt may be perpendicular to the main surface of the plate, and the upper surface of the second belt may be in parallel with the main surface of the plate.

In some embodiments, the glass transportation apparatus may further include an angle adjustment device configured to adjust angles formed by the main surface of the plate, the upper surface of the first belt, and the upper surface of the second belt with respect to a gravity direction.

In some embodiments, the glass transportation apparatus may further include a gas blowing device configured to blow a gas towards the main surface of the glass pane such that the main surface of the glass pane is spaced apart from the main surface of the plate.

The gas blowing device is configured to blow the gas towards the main surface of the glass pane through an opening in the plate.

According to one or more embodiments, a system for manufacturing a multi-pane glass unit includes the glass transportation apparatus.

According to one or more embodiments, a system for manufacturing a multi-pane glass unit, the system includes a pressing apparatus configured to attach an inner glass pane to a first outer glass pane via a first spacer and attach a second outer glass pane to the inner glass pane via a second spacer, the inner glass pane being thinner than the first outer glass pane and the second outer glass pane; and the glass transportation apparatus configured to transport the first outer glass pane, the inner glass pane, and the second outer glass pane sequentially to the pressing apparatus.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, one or more embodiments of the present disclosure will be described in detail with reference to accompanying drawings. Various modifications, additions and substitutions of the embodiment of the present disclosure are possible, and thus it will be appreciated that the disclosure is not limited to the following embodiments. The embodiments of the present disclosure are provided so that this disclosure will be thorough and complete, and will fully convey the concept of the present disclosure to one of ordinary skill in the art. Like reference numerals may denote like elements throughout the specification. Moreover, various elements and regions in the drawings are schematically illustrated. Accordingly, the disclosure is not limited by relative sizes or intervals illustrated in the attached drawings.

Figure 1:
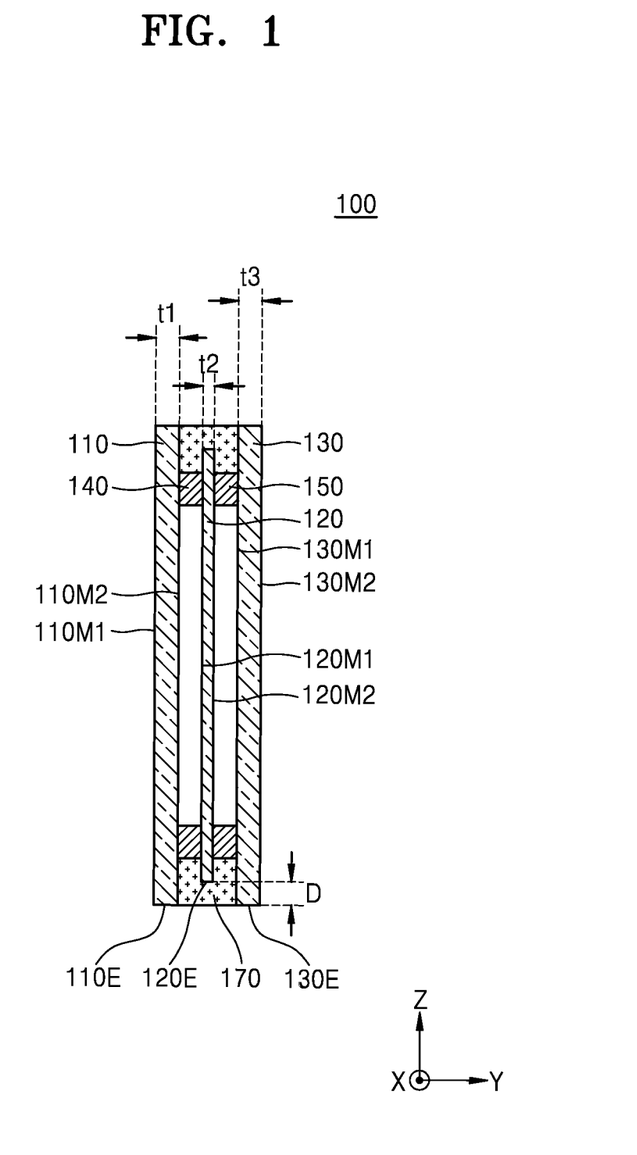
FIG. 1 is a cross-sectional view of a multi-pane glass unit according to an embodiment of the disclosure.

FIG. 1 is a cross-sectional view of a multi-pane glass unit 100 according to an embodiment of the disclosure.

Referring to FIG. 1, the multi-pane glass unit 100 may include a plurality of glass panes 110, 120, and 130. For example, the multi-pane glass unit 100 may include a first outer glass pane 110, an inner glass pane 120, and a second outer glass pane 130. Although the multi-pane glass unit 100 shown in FIG. 1 includes only one inner glass pane 120, the multi-pane glass unit 100 may include a plurality of inner glass panes 120 between the first outer glass pane 110 and the second outer glass pane 130. As the number of the inner glass panes 120 increases, heat insulation, soundproof, and/or anti-dew condensation performances may be improved.

The first outer glass pane 110 may include two main surfaces 110M1 and 110M2 facing each other, and one or more edge surfaces 110E between the two main surfaces 110M1 and 110M2. In some embodiments, the two main surfaces 110M1 and 110M2 of the first outer glass pane 110 may be substantially parallel to each other. Similarly, the second outer glass pane 130 may include two main surfaces 130M1 and 130M2 facing each other, and one or more edge surfaces 130E between the two main surfaces 130M1 and 130M2. In some embodiments, the two main surfaces 130M1 and 130M2 of the second outer glass pane 130 may be substantially parallel to each other. The inner glass pane 120 may include two main surfaces 120M1 and 120M2 facing each other, and one or more edge surfaces 120E between the two main surfaces 120M1 and 120M2. In some embodiments, the two main surfaces 120M1 and 120M2 of the inner glass pane 120 may be substantially parallel to each other.

The first main surface 120M1 of the inner glass pane 120 may face the second main surface 110M2 of the first outer glass pane 110, and the second main surface 120M2 of the inner glass pane 120 may face the first main surface 130M1 of the second outer glass pane 130. In some embodiments, the first main surface 120M1 of the inner glass pane 120 may be substantially parallel to the second main surface 110M2 of the first outer glass pane 110, and the second main surface 120M2 of the inner glass pane 120 may be substantially parallel to the first main surface 130M1 of the second outer glass pane 130.

A thickness t1 of the first outer glass pane 110 between the two main surfaces 110M1 and 110M2 of the first outer glass pane 110 and a thickness t3 of the second outer glass pane 130 between the two main surfaces 130M1 and 130M2 of the second outer glass pane 130 may each range from about 1 mm to about 50 mm. In some embodiments, a thickness t2 of the inner glass pane 120 between the two main surfaces 120M1 and 120M2 of the inner glass pane 120 may be less than the thickness t1 of the first outer glass pane 110 and the thickness t3 of the second outer glass pane 130. For example, the thickness t2 of the inner glass pane 120 may be about 0.2 mm to about 1.0 mm.

As the thickness t2 of the inner glass pane 120 is reduced, a weight of the multi-pane glass unit 100 may be reduced. For example, when the thickness t2 of the inner glass pane 120 is about 1/10 of the thickness t1 of the first outer glass pane 110 and the thickness t3 of the second outer glass pane 130, the weight of the multi-pane glass unit 100 may be reduced by about 30% as compared with the case in which the thickness t2 of the inner glass pane 120 is equal to the thickness t1 of the first outer glass pane 110 and the thickness t3 of the second outer glass pane 130. In particular, even when the number of the inner glass panes is increased in order to improve the soundproof and/or anti-dew condensation performances, the weight increase of the multi-pane glass unit 100 may be reduced. Also, as the thickness t2 of the inner glass pane 120 is reduced, a thickness of a gas layer between the first outer glass pane 110 and the inner glass pane 120 and a thickness of a gas layer between the inner glass pane 120 and the second outer glass pane 130 may increase to improve the heat insulation performance. Also, as the thickness t2 of the inner glass pane 120 is reduced, a light transmittance may be improved.

However, when the thickness t2 of the inner glass pane 120 is reduced, it may be difficult to handle the inner glass pane 120. In particular, when the thickness t2 of the inner glass pane 120 is less than about 1.0 mm, a strengthening process such as heat-strengthening or chemical strengthening may not be performed. In some embodiments, the inner glass pane 120 may not undergo the strengthening process such as the heat-strengthening or the chemical strengthening. Therefore, in this case, the thickness t2 of the inner glass pane 120 may be about 1.0 mm or less. However, when the thickness t2 of the inner glass pane 120 is less than about 0.2 mm, it is difficult to handle the inner glass pane 120 and it may be difficult to manufacture the multi-pane glass unit 100. Therefore, the thickness t2 of the inner glass pane 120 may be about 0.2 mm or greater.

When the thickness t2 of the inner glass pane 120 is less than the thickness t1 of the first outer glass pane 110 and the thickness t3 of the second outer glass pane 130, the inner glass pane 120 may be vulnerable to damage caused by physical contact and/or impact as compared with the first outer glass pane 110 and the second outer glass pane 130. In this case, in order to protect the inner glass pane 120 against physical contact and/or impact, an circumference of the inner glass pane 120 may be offset inward with respect to a an circumference of the first outer glass pane 110 and an circumference of the second outer glass pane 130. For example, the edge surface 120E of the inner glass pane 120 may be offset inward (in Z-direction) with respect to the edge surface 110E of the first outer glass pane 110 and the edge surface 130E of the second outer glass pane 130. An offset distance D of the circumference of the inner glass pane 120 inward from the circumference of the first outer glass pane 110 and the circumference of the second outer glass pane 130 may be about 0.1 mm to about 100 mm, for example, about 0.5 mm to about 10 mm, e.g., about 1 mm to about 5 mm. In another embodiment, the circumference of the inner glass pane 120 may not be offset inward with respect to the circumference of the first outer glass pane 110 and the circumference of the second outer glass pane 130. That is, the main surfaces 120M1 and 120M2 of the inner glass pane 120 may have the same areas as those of the main surfaces 110M1 and 110M2 of the first outer glass pane 110 and the main surfaces 130M1 and 130M2 of the second outer glass pane 130, and only the thickness t2 of the inner glass pane 120 may be less than the thickness t1 of the first outer glass pane 110 and the thickness t3 of the second outer glass pane 130.

The first outer glass pane 110, the inner glass pane 120, and the second outer glass pane 130 may each include a glass material including soda lime, borosilicate glass, aluminosilicate glass, boroaluminosilicate glass, or a combination thereof. In some embodiments, the first outer glass pane 110 and the second outer glass pane 130 may include soda lime glass that is frequently used for windows, and the inner glass pane 120 may include boroaluminosilicate glass. The inner glass pane 120 may include, for example, Eagle XG® available from Corning Incorporated. Table 1 below shows a composition of general soda lime glass, and Table 2 below shows a composition of an example of boroaluminosilicate glass.

TABLE 1

| | Composition (wt %) |
|---|---|
| $SiO_2$ | 72~74 |
| $Na_2O$ | 13~14 |
| CaO | 9~11 |
| $Al_2O_3$ | 1.0~2.0 |
| $K_2O$ | 0.01~0.3 |
| MgO | 0.01~4.0 |
| $Fe_2O_3$ | 0.01~0.2 |
| $TiO_2$ | 0.01~0.1 |

TABLE 2

| | Composition (wt %) |
|---|---|
| $SiO_2$ | 55~65 |
| $Al_2O_3$ | 15~20 |
| $B_2O_3$ | 5~15 |
| MgO | 0.1~5 |
| CaO | 1~10 |
| SrO | 0.5~8.0 |
| BaO | 0.01~0.5 |

In a case in which the inner glass pane 120 includes boroaluminosilicate glass, even when the inner glass pane 120 may not undergo the strengthening process due to the excessively small thickness of the inner glass pane 120 (e.g., 1.0 mm or less), a thermal expansion coefficient (e.g., about $3\times10^{-6}/°$ C. to about $4\times10^{-6}/°$ C.) of the boroaluminosilicate glass may be less than that (e.g., about $9\times10^{-6}/°$ C. to about $1\times10^{-5}/°$ C.) of the soda lime glass, and accordingly, a thermal stress caused by a temperature difference in the inner glass pane 120 may be reduced. Therefore, a probability of occurrence of thermal damage due to the temperature variation in the inner glass pane 120 may be reduced.

When the thickness and/or composition of the inner glass pane 120 are different from the thickness and/or composition of each of the first outer glass pane 110 and the second outer glass pane 130, a sunlight transmittance of the inner glass pane 120 may be greater than that of the first outer glass pane 110 and that of the second outer glass pane 130. For example, the sunlight transmittance of the inner glass pane 120 may be about 90% to about 95%, and the sunlight transmittance of each of the first outer glass pane 110 and the second outer glass pane 130 may be about 75% to about 85%. Therefore, the light transmittance of the multi-pane glass unit 100 may be increased as compared with a case in which the inner glass pane 120 has the same thickness and composition as those of the first outer glass pane 110 and the second outer glass pane 130.

Also, when the thickness and/or the composition of the inner glass pane 120 are different from the thickness and/or composition of each of the first outer glass pane 110 and the second outer glass pane 130, a sunlight absorption of the inner glass pane 120 may be less than that of the first outer glass pane 110 and that of the second outer glass pane 130. For example, the sunlight absorption of the inner glass pane 120 may be about 0.1% to about 1.0%, and the sunlight absorption of the first outer glass pane 110 and the second outer glass pane 130 may be about 5.0% to about 15.0%. In the disclosure, a solar spectrum is according to the NFRC100-2010 standard. When the sunlight absorption of the inner glass pane 120 is reduced, a temperature of the inner glass pane 120 does not largely increase when the inner glass pane 120 is exposed to sunlight, and thus, a risk of thermal damage of the inner glass pane 120 may be reduced.

Also, when the composition of the inner glass pane 120 is different from the composition of each of the first outer glass pane 110 and the second outer glass pane 130, a density of the inner glass pane 120 may be less than that of the first outer glass pane 110 and that of the second outer glass pane 130. For example, the density of the inner glass pane 120 including the boroaluminosilicate glass may be about 2.3 $g/cm^3$ to about 2.5 $g/cm^3$, and the density in each of the first outer glass pane 110 and the second outer glass pane 130 including the soda lime glass may be about 2.5 $g/cm^3$ to about 2.6 $g/cm^3$. When the density of the inner glass pane 120 is reduced, the weight of the inner glass pane 120 is reduced and the weight of the multi-pane glass unit 100 is also reduced.

The multi-pane glass unit 100 may further include a plurality of spacers 140 and 150 for separating the plurality of glass panes 110 to 130 from one another. The first outer glass pane 110 and the inner glass pane 120 may be spaced apart from each other by the first spacer 140. That is, the first spacer 140 may be located between the first outer glass pane 110 and the inner glass pane 120. The second outer glass pane 130 and the inner glass pane 120 may be spaced apart from each other by the second spacer 150. That is, the second spacer 150 may be located between the second outer glass pane 130 and the inner glass pane 120. The first spacer 140 and the second spacer 150 may include a material, for example, a metal such as aluminum or a plastic composite material such as a warm edge spacer. A space defined by the first outer glass pane 110, the inner glass pane 120, and the first spacer 140 and a space defined by the inner glass pane 120, the second outer glass pane 130, and the second spacer 150 may be each filled with a gas including an inert gas such as Ar, or Kr; air; or a combination thereof. The gas may improve a heat insulating performance of the multi-pane glass unit 100.

In some embodiments, the multi-pane glass unit 100 may further include a sealing material 170. The sealing material 170 may surround a circumference of the first spacer 140 and a circumference of the second spacer 150. The sealing material 170 may prevent degradation of the heat insulating performance of the multi-pane glass unit 100 caused by infiltration of moisture into the space defined by the first outer glass pane 110, the inner glass pane 120, and the first spacer 140 or the space defined by the inner glass pane 120, the second outer glass pane 130, and the second spacer 150, or because of the gas in the space defined by the first outer glass pane 110, the inner glass pane 120, and the first spacer 140 or the space defined by the inner glass pane 120, the second outer glass pane 130, and the second spacer 150 leaks out of the multi-pane glass unit 100. The sealing material 170 may include, for example, a silicon resin or a polysulfide resin.

Figure 2:
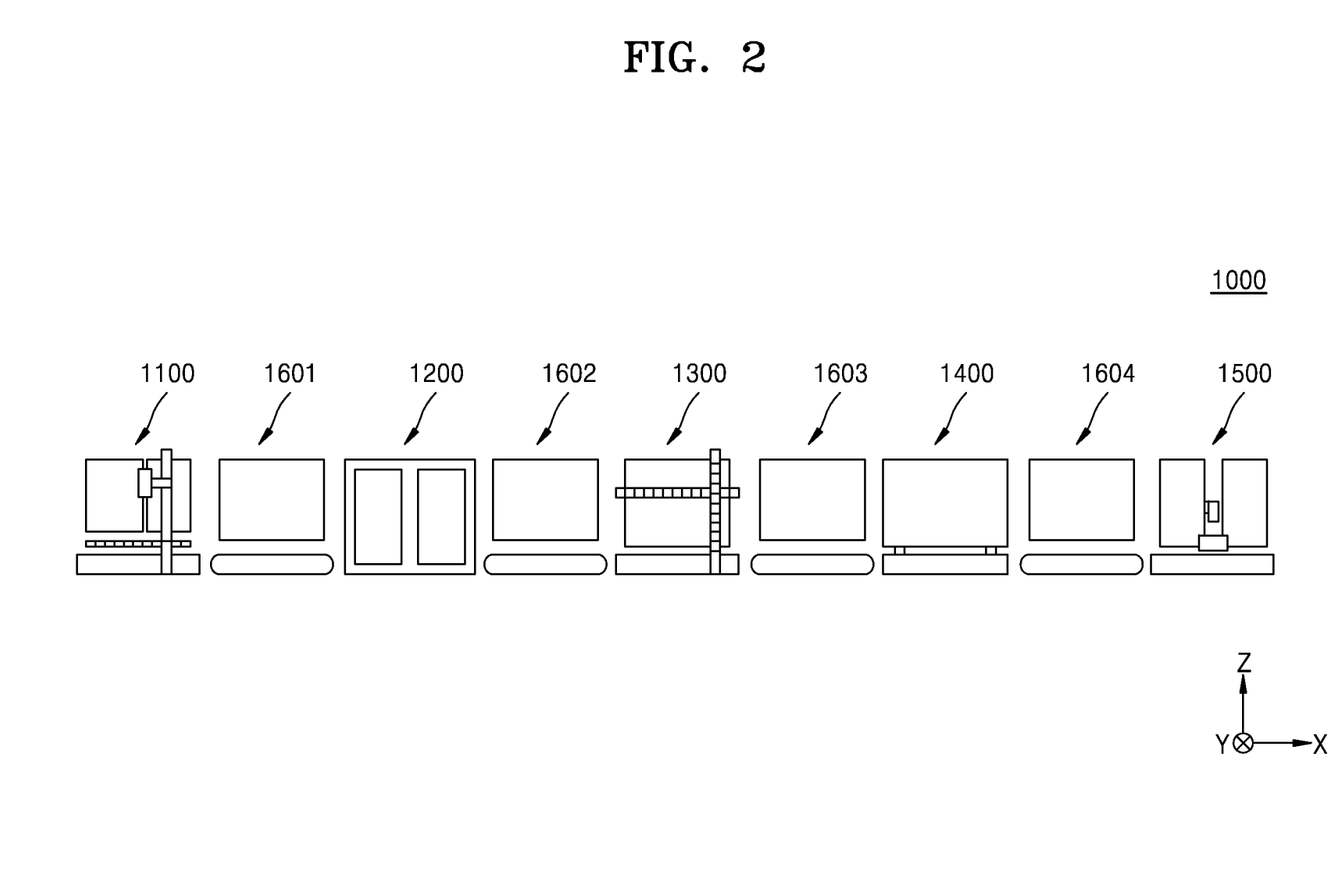
FIG. 2 is a diagram of a system for manufacturing a multi-pane glass unit according to an embodiment of the disclosure.

FIG. 2 is a diagram of a system 1000 for manufacturing a multi-pane glass unit according to an embodiment of the disclosure.

Referring to FIG. 2, the system 1000 for manufacturing the multi-pane glass unit may include a plurality of processing apparatuses 1100, 1200, 1300, 1400, and 1500 and a plurality of glass transportation apparatuses 1601, 1602, 1603, and 1604 for transporting glass panes among the plurality of processing apparatuses 1100, 1200, 1300, 1400, and 1500. In FIG. 2, the system 1000 for manufacturing the multi-pane glass unit includes five processing apparatuses 1100, 1200, 1300, 1400, and 1500; however, the number of processing apparatuses included in the system 1000 for manufacturing the multi-pane glass unit may be greater or less than five. Similarly, FIG. 2 shows that the system 1000 for manufacturing the multi-pane glass unit includes four glass transportation apparatuses 1601, 1602, 1603, and 1604; however, the number of glass transportation apparatuses included in the system 1000 for manufacturing the multi-pane glass unit may be greater or less than four.

The first processing apparatus 1100 may be a cutting apparatus configured to cut a glass pane to a desired size. The first processing apparatus 1100 may be further configured to polish the cut glass pane. The second processing apparatus 1200 may be a washing apparatus configured to wash the glass pane. The second processing apparatus 1200 may be further configured to dry the washed glass pane. The third processing apparatus 1300 may be a spacer attaching apparatus that attaches the spacer to the glass pane. The fourth processing apparatus 1400 may be a pressing apparatus configured to attach the glass pane, to which the spacer is attached, to another glass pane. The fourth processing apparatus 1400 may be further configured to inject a gas between the glass panes. The fifth processing apparatus 1500 may be a sealing apparatus for forming a sealing material.

The first glass transportation apparatus 1601 may be arranged to transport the glass pane from the first processing apparatus 1100 to the second processing apparatus 1200, the second glass transportation apparatus 1602 may be arranged to transport the glass pane from the second processing apparatus 1200 to the third processing apparatus 1300, the third glass transportation apparatus 1603 may be arranged to transport the glass pane from the third processing apparatus 1300 to the fourth processing apparatus 1400, and the fourth glass transportation apparatus 1604 may be arranged to transport the glass pane from the fourth processing apparatus 1400 to the fifth processing apparatus 1500. The glass transportation apparatuses 1601, 1602, 1603, and 1604 each may be one of a glass transportation apparatus 1600 described below with reference to FIGS. 3A and 3B, a glass transportation apparatus 1600A described below with reference to FIG. 4, a glass transportation apparatus 1600B described below with reference to FIGS. 5A and 5B, and a glass transportation apparatus 1600C described below with reference to FIGS. 6A and 6B.

Hereinafter, a method of manufacturing the multi-pane glass unit 100 by using the system 1000 will be described below with reference to FIG. 1 and FIG. 2. First, the first outer glass pane 110 may be fed into the first processing apparatus 1100 and cut by the first processing apparatus 1100. Additionally, an edge surface of the first outer glass pane 110 cut by the first processing apparatus 1100 may be polished. After that, the first outer glass pane 110 may be transferred from the first processing apparatus 1100 to the second processing apparatus 1200 by the first glass transportation apparatus 1601. The first outer glass pane 110 may be washed by the second processing apparatus 1200. Additionally, the first outer glass pane 110 may be dried by the second processing apparatus 1200. After that, the first outer glass pane 110 may be transferred from the second processing apparatus 1200 to the third processing apparatus 1300 by the second glass transportation apparatus 1602. After that, the first outer glass pane 110 may pass through the third processing apparatus 130 and then may be transferred from the third processing apparatus 1300 to the fourth processing apparatus 1400 by the third glass transportation apparatus 1603. The first outer glass pane 110 may stand by in the fourth processing apparatus 1400.

Next, the inner glass pane 120 may be fed into the first processing apparatus 1100 and cut by the first processing apparatus 1100. In some embodiments, the inner glass pane 120 may be cut to have a smaller size than that of the first outer glass pane 110 and the second outer glass pane 130. Additionally, an edge surface of the inner glass pane 120 cut by the first processing apparatus 1100 may be polished. After that, the inner glass pane 120 may be transferred from the first processing apparatus 1100 to the second processing apparatus 1200 by the first glass transportation apparatus 1601. The inner glass pane 120 may be washed by the second processing apparatus 1200. Additionally, the inner glass pane 120 may be dried by the second processing apparatus 1200. After that, the inner glass pane 120 may be transferred from the second processing apparatus 1200 to the third processing apparatus 1300 by the second glass transportation apparatus 1602. After that, the first spacer 140 may be attached onto the inner glass pane 120 by the third processing apparatus 1300. The inner glass pane 120 on which the first spacer 140 is attached may be transferred from the third processing apparatus 1300 to the fourth processing apparatus 1400 by the third glass transportation apparatus 1603. After that, the inner glass pane 120 on which the first spacer 140 is attached may be attached to the first outer glass pane 110 via the first spacer 140 by the fourth processing apparatus 1400, wherein the first outer glass pane 110 was in a waiting state in the fourth processing apparatus 1400. The inner glass pane 120 attached to the first outer glass pane 110 via the first spacer 140 may remain in a waiting state in the fourth processing apparatus 1400.

Next, the second outer glass pane 130 may be fed into the first processing apparatus 1100 and cut by the first processing apparatus 1100. Additionally, an edge surface of the second outer glass pane 130 cut by the first processing apparatus 1100 may be polished. After that, the second outer glass pane 130 may be transferred from the first processing apparatus 1100 to the second processing apparatus 1200 by the first glass transportation apparatus 1601. The second outer glass pane 130 may be washed by the second processing apparatus 1200. Additionally, the second outer glass pane 130 may be dried by the second processing apparatus 1200. After that, the second outer glass pane 130 is transferred from the second processing apparatus 1200 to the third processing apparatus 1300 by the second glass transportation apparatus 1602. After that, the second spacer 150 may be attached onto the second outer glass pane 130 by the third processing apparatus 1300. The second outer glass pane 130 on which the second spacer 150 is attached may be transferred from the third processing apparatus 1300 to the fourth processing apparatus 1400 by the third glass transportation apparatus 1603. After that, the second outer glass pane 130 on which the second spacer 150 is attached may be attached to the inner glass pane 120 via the second spacer 150 by the fourth processing apparatus 1400, wherein the inner glass pane 120 was in a waiting state in the fourth processing apparatus 1400.

Next, the glass panes (110 to 130) attached to one another via the first and second spacers 140 and 150 may be transferred from the fourth processing apparatus 1400 to the fifth processing apparatus 1500 by the fourth glass transportation apparatus 1604. The sealing material 170 may be formed on the circumferences of the first and second spacers 140 and 150 by the fifth processing apparatus 1500. According to the above method, the multi-pane glass unit 100 may be manufactured. When the multi-pane glass unit 100 is manufactured by using the system 1000, it may be necessary to prevent damage and/or breakage of the inner glass pane 120 when the inner glass pane 120 having a relatively smaller thickness t2 is transported. Also, when the glass panes 110 to 130 having different thicknesses from one another are transported sequentially, it may be necessary to prevent the glass panes 110 to 130 from falling down.

Figure 3A:
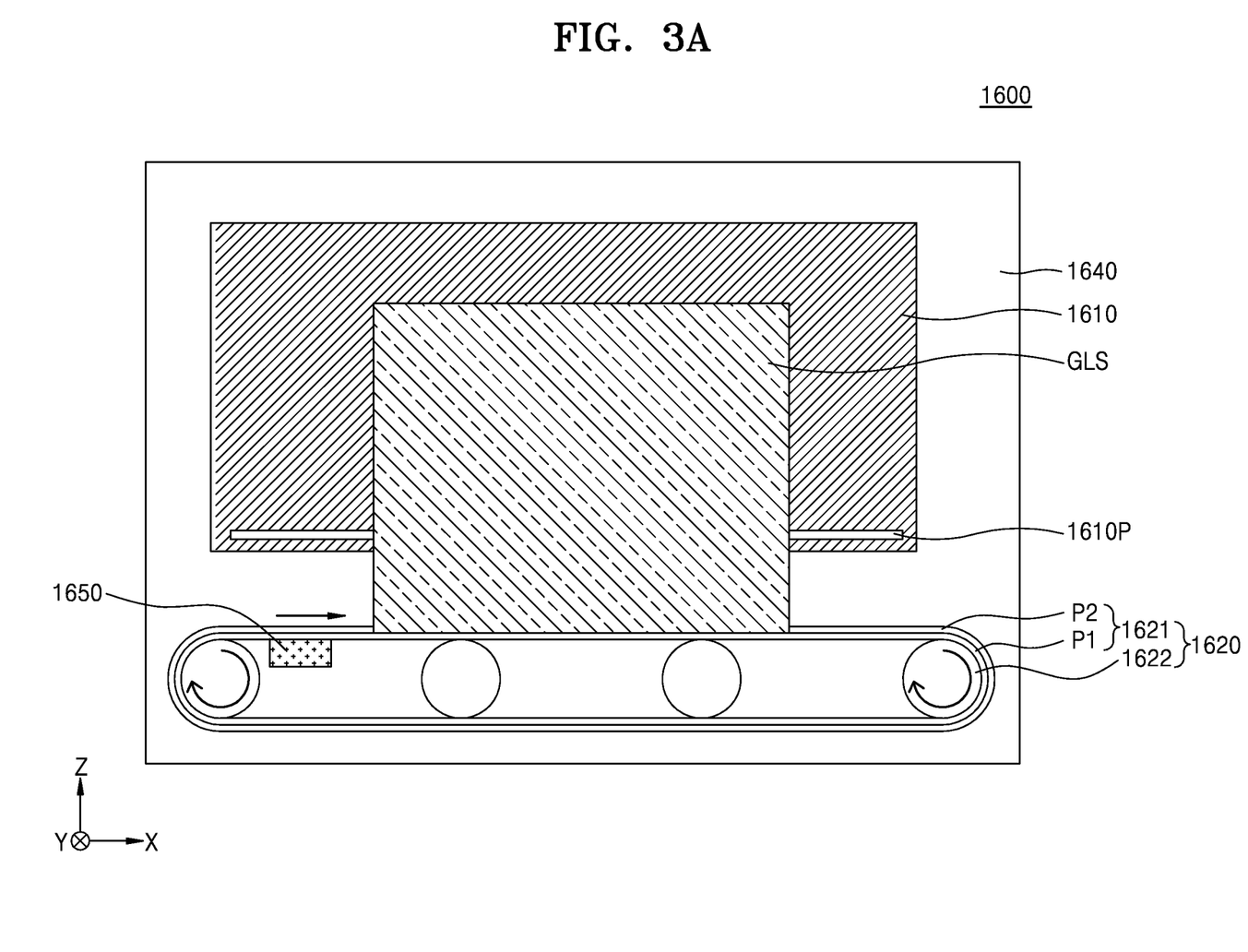
FIGS. 3A and 3B are side views of a glass transportation apparatus according to an embodiment of the disclosure.
Figure 3B:
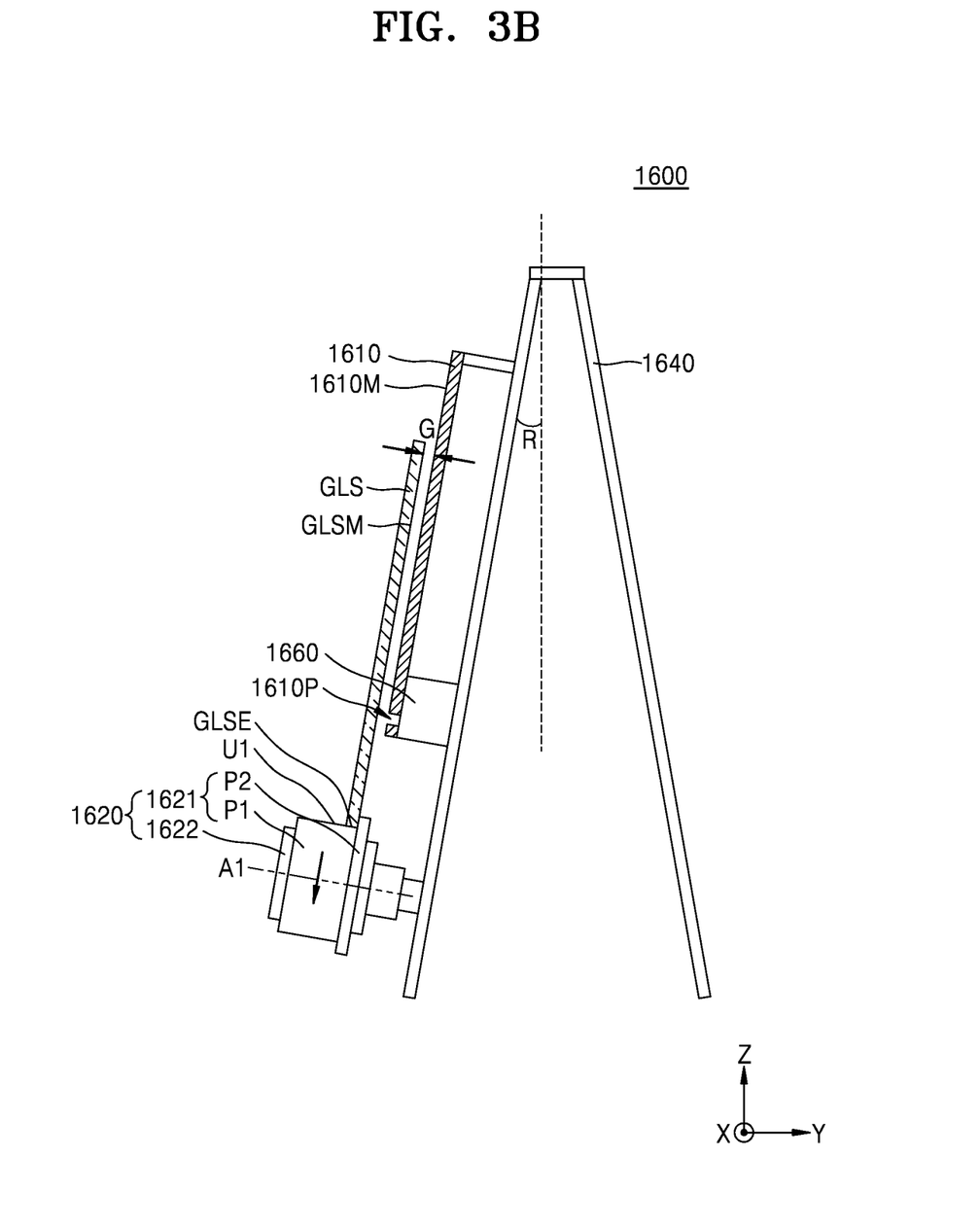
Figure 4:
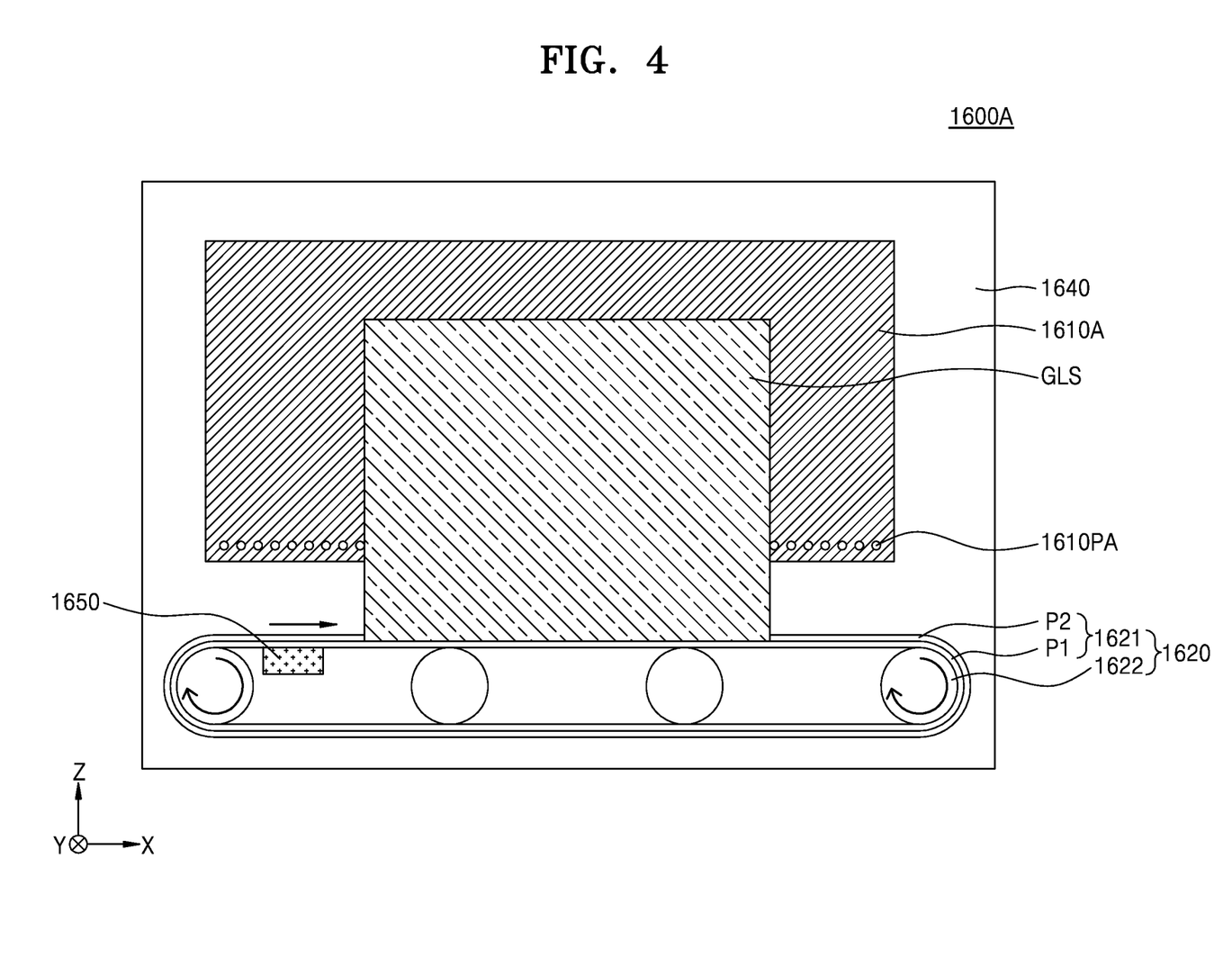
FIG. 4 is a side view of a glass transportation apparatus according to an embodiment of the disclosure.

FIGS. 3A and 3B are side views of a glass transportation apparatus 1600 according to an embodiment of the disclosure. FIG. 4 is a side view of a glass transportation apparatus 1600A according to an embodiment of the disclosure.

Referring to FIG. 3A and FIG. 3B, the glass transportation apparatus 1600 may include a plate 1610 and a conveyer 1620. The plate 1610 may have a main surface 1610M facing a main surface GLSM of a glass pane GLS. The plate 1610 may prevent the glass pane GLS from falling. The conveyer 1620 may transport the glass pane GLS in an X direction. The conveyer 1620 may be a belt conveyer. That is, the conveyer 1620 may include a belt 1621 and a plurality of pulleys 1622 configured to circulate the belt 1621. Some of the plurality of pulleys 1622, for example, a front end pulley and a rear end pulley may be driven by a motor, but the other pulleys may support the belt 1621 in an idle state. The pulleys 1622 may rotate about a rotation axis A1. The belt 1621 may include a soft material such as rubber in order to prevent damage to the glass pane GLS. In some embodiments, an upper surface U1 of the belt 1621 may be perpendicular to the main surface 1610M of the plate 1610. By using the belt conveyer 1620 instead of a roller conveyer used to transport a thick glass pane in the related art, the thin glass pane GLS may be prevented from being trapped between rollers, being damaged, or falling down.

In some embodiments, the belt 1621 may include a base portion P1 having an upper surface U1 that is flat and a protrusion P2 protruding from the upper surface U1 of the base portion P1. In some embodiments, the protrusion P2 of the belt 1621 may extend along an entire circumference of the belt 1621. The base portion P1 of the belt 1621 may be in contact with an edge surface GLSE of the glass pane GLS and the protrusion P2 of the belt 1621 may be in contact with the main surface GLSM of the glass pane GLS. The protrusion P2 of the belt 1621 may assist in preventing the glass pane GLS from falling. In the related art, the transportation of the glass pane GLS may be performed by using side wheels in contact with the main surface of the glass pane GLS; however, the glass transportation apparatus 1600 according to the embodiment of the disclosure may not include side wheels. Therefore, damage or breakage of the thin glass pane GLS when the glass pane GLS is stuck among the side wheels, falling down of the glass pane GLS, or damage or breakage of the glass pane GLS due to contact with the side wheels may be prevented. Instead, the belt 1621 including the base portion P1 and the protrusion P2 is used to prevent the glass pane GLS from falling down and to assist the transportation of the glass panel GLS.

In some embodiments, the glass transportation apparatus 1600 may further include a gas blowing device 1660 that blows a gas towards the main surface GLSM of the glass pane GLS, so that the main surface GLSM of the glass panel GLS may be spaced apart from the main surface 1610M of the plate 1610. In some embodiments, the gas blowing device 1660 may blow the gas towards the main surface GLSM of the glass pane GLS through an opening 1610P of the plate 1610. In some embodiments, the opening 1610P of the plate 1610, through which the gas is blown, may have a long slit shape located in a lower portion of the plate 1610 as shown in FIG. 3A. However, the shape and the number of the opening 1610P in the plate 1610 may not be limited to the example of FIG. 3A. For example, as shown in FIG. 4, openings 1610PA in a plate 1610A may be provided as a plurality of holes at a lower portion of the plate 1610A.

A flow of the gas blown towards the main surface GLSM of the glass pane GLS collides with the main surface GLSM of the glass pane GLS, and after that, the gas may flow along the main surface GLSM of the glass pane GLS. Due to the flow of the gas, a gap G may be generated between the main surface GLSM of the glass pane GLS and the main surface 1610M of the plate 1610. The gap G between the main surface GLSM of the glass pane GLS and the main surface 1610M of the plate 1610 may be about 1 mm to about 10 mm, for example, about 3 mm to about 6 mm. Since the glass pane GLS is prevented from being in contact with the plate 1610, damage or breakage of the glass pane GLS due to contact with the plate 1610 may be prevented.

In order to prevent the glass pane GLS from falling down, the glass transportation apparatus 1600 may transport the glass pane GLS in an inclined state with respect to a gravity direction (−Z direction). That is, the main surface 1610M of the plate 1610 is inclined with respect to the gravity direction (−Z direction), and the upper surface U1 of the belt 1621 may be inclined with respect to a direction (Y direction) perpendicular to the gravity direction (−Z direction). In some embodiments, the glass transportation apparatus 1600 may further include an angle adjustment device 1640 configured to adjust an angle R at which the main surface 1610M of the plate 1610 is inclined with respect to the gravity direction (−Z direction) and an angle R at which the upper surface U1 of the belt 1621 is inclined with respect to the direction (Y direction) perpendicular to the gravity direction (−Z direction).

A flow rate of the gas blown by the gas blowing device 1660 and the angle R have to be adjusted in order to generate the gap G between the plate 1610 and the glass pane GLS while preventing the glass pane GLS from falling down. When the flow rate of the gas is small, the glass pane GLS may be in contact with the plate 1610, and when the flow rate of the gas is large, the glass pane GLS may fall down. When the angle R is too large, the glass pane GLS may be in contact with the plate 1610, and when the angle R is too small, the glass pane GLS may fall down. At least one of the flow rate of the gas blown by the gas blowing device 1660 and the angle R adjusted by the angle adjustment device 1640 may be adjusted according to a weight of the glass pane GLS that is transported. As the weight of the glass pane GLS is reduced, the flow rate of the gas blown by the gas blowing device 1660 may be reduced and/or the angle R adjusted by the angle adjustment device 1640 may be increased in order to prevent the glass pane GLS from falling.

For example, when the first and second outer glass panes 110 and 130 (see FIG. 1) that each have a thickness of about 1 mm to about 50 mm and may be relatively thick are transported by the glass transportation apparatus 1600, the flow rate of the gas blown by the gas blowing device 1660 may be adjusted to be about 800 $m^3$/hour to about 1600 $m^3$/hour, and the angle R adjusted by the angle adjustment device 1640 may be adjusted to be about 5° to about 8°. When the inner glass pane 120 (see FIG. 1) that has a thickness of about 0.2 mm to about 1 mm and is relatively lightweight is transported by the glass transportation apparatus 1600, the flow rate of the gas blown by the gas blowing device 1660 may be adjusted to be about 200 $m^3$/hour to about 800 $m^3$/hour and/or the angle R adjusted by the angle adjustment device 1640 may be adjusted to be about 8° to about 14°.

Because the first outer glass pane 110 (see FIG. 1), the inner glass pane 120 (see FIG. 1), and the second outer glass pane 130 (see FIG. 1) are sequentially transported by the glass transportation apparatus 1600 in order to manufacture the multi-pane glass unit 100 (see FIG. 1), the flow rate of the gas blown by the gas blowing device 1660 may be switched sequentially from about 800 $m^3$/hour to about 1600 $m^3$/hour, about 200 $m^3$/hour to about 800 $m^3$/hour, and about 800 $m^3$/hour to about 1600 $m^3$/hour and/or the angle R adjusted by the angle adjustment device 1640 may be changed sequentially to about 5° to about 8°, about 8° to about 14°, and about 5° to about 8°. In some embodiments, the angle R adjusted by the angle adjustment device 1640 is fixed to a value of about 8° to about 14°, and then the flow rate of the gas blown by the gas blowing device 1660 may be sequentially changed to range from about 800 $m^3$/hour to about 1600 $m^3$/hour, about 200 $m^3$/hour to about 800 $m^3$/hour, and about 800 $m^3$/hour to about 1600 $m^3$/hour.

In some embodiments, the glass transportation apparatus 1600 may further include a sensor 1650 that senses the glass pane GLS fed onto the conveyer 1620 and controls at least one of the flow rate of the gas blown by the gas blowing device 1660 and/or the angle R adjusted by the angle adjustment device 1640 according to an order in which the glass panes GLS are fed into the glass transportation apparatus 1600. In another embodiment, the sensor 1650 senses the weight or the thickness of the glass pane GLS, and may control at least one of the flow rate of the gas blown by the gas blowing device 1660 and the angle R adjusted by the angle adjustment device 1640 according to the weight or the thickness of the glass pane GLS. FIG. 3A shows that the sensor 1650 is attached onto the conveyer 1620; however, the sensor 1650 may be attached to the plate 1610 or at another arbitrary position.

Figure 5A:
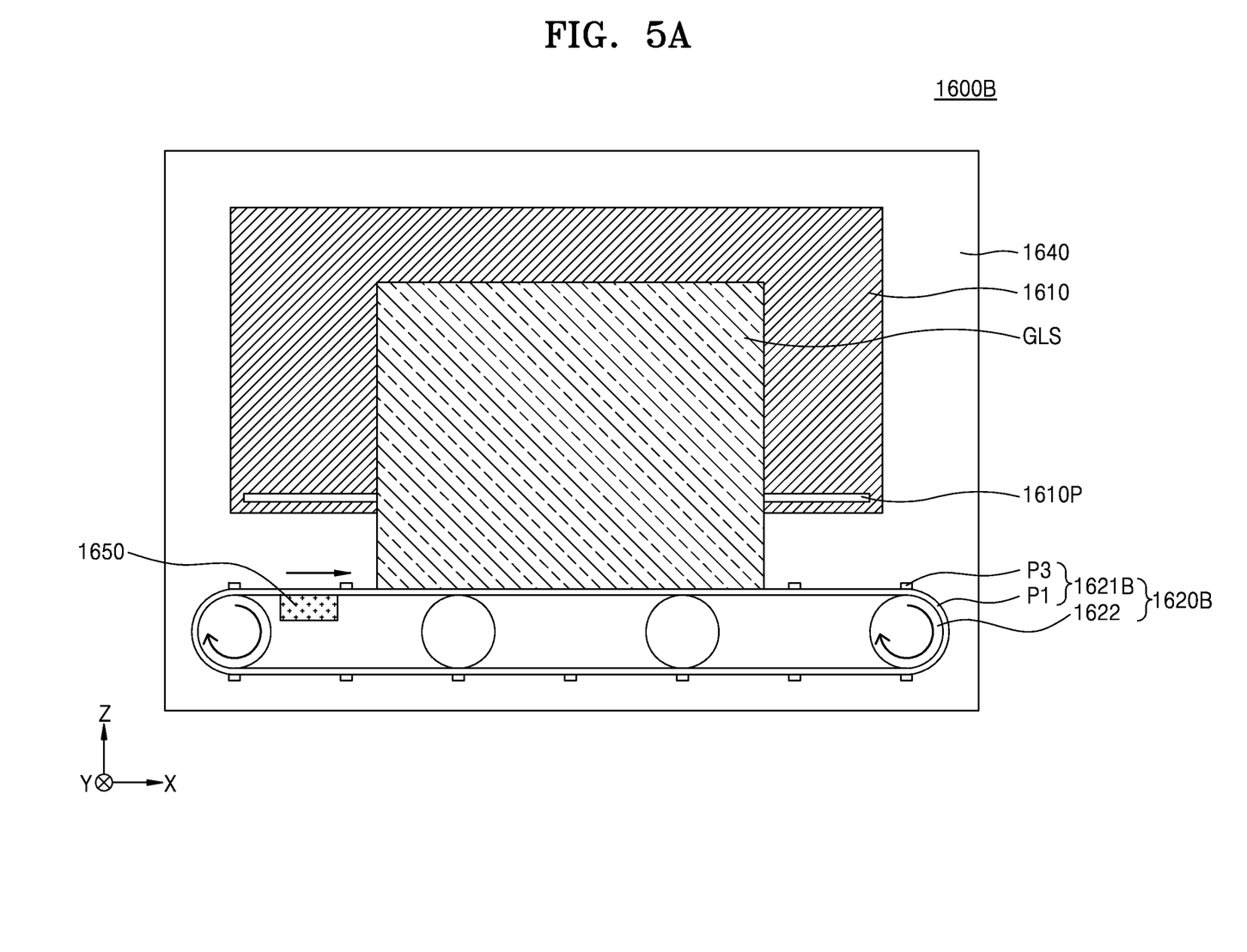
FIGS. 5A and 5B are side views of a glass transportation apparatus according to an embodiment of the disclosure.
Figure 5B:
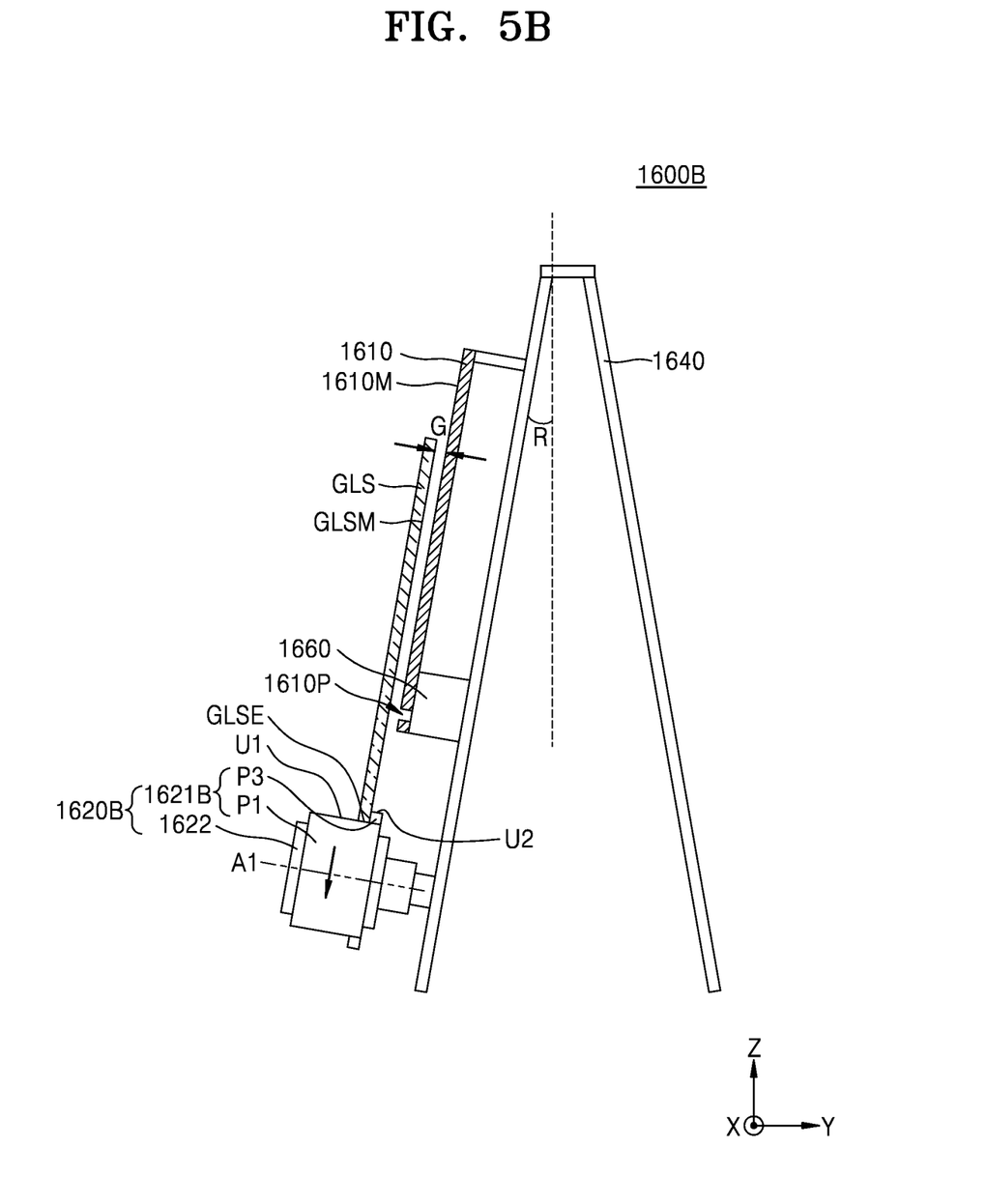

FIGS. 5A and 5B are side views of a glass transportation apparatus 1600B according to an embodiment of the disclosure. Hereinafter, differences between the glass transportation apparatus 1600B shown in FIGS. 5A and 5B and the glass transportation apparatus 1600 shown in FIGS. 3A and 3B will be described below.

Referring to FIGS. 5A and 5B, a belt 1621B of a conveyer 1620B may include the base portion P1 having the upper surface U1 that is flat and a plurality of protrusions P3 protruding from the upper surface U1 of the base portion P1. In some embodiments, the protrusions P3 of the belt 1621B may be arranged along a circumference of the belt 1621B.

Figure 6A:
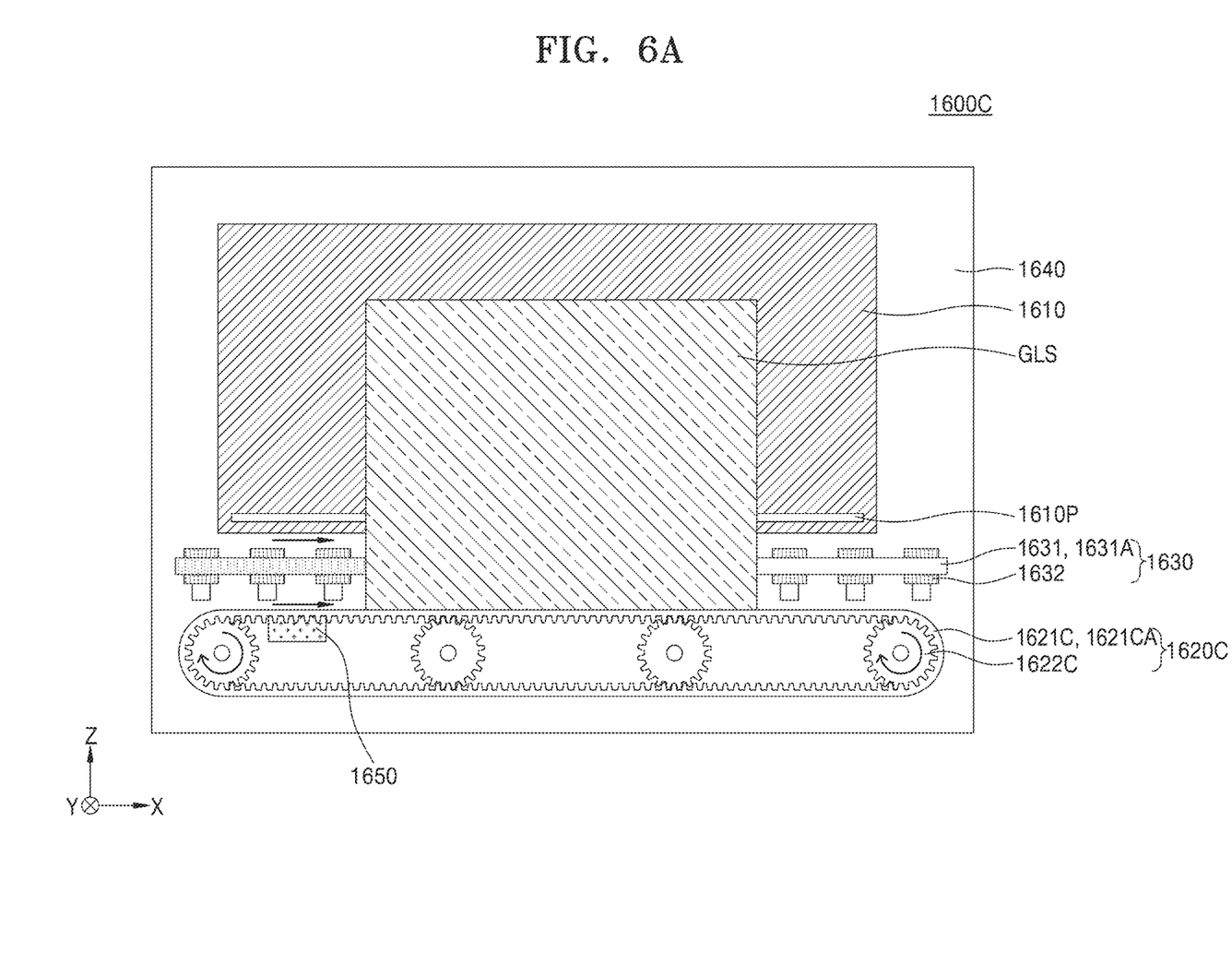
FIGS. 6A and 6B are side views of a glass transportation apparatus according to an embodiment of the disclosure.
Figure 6B:
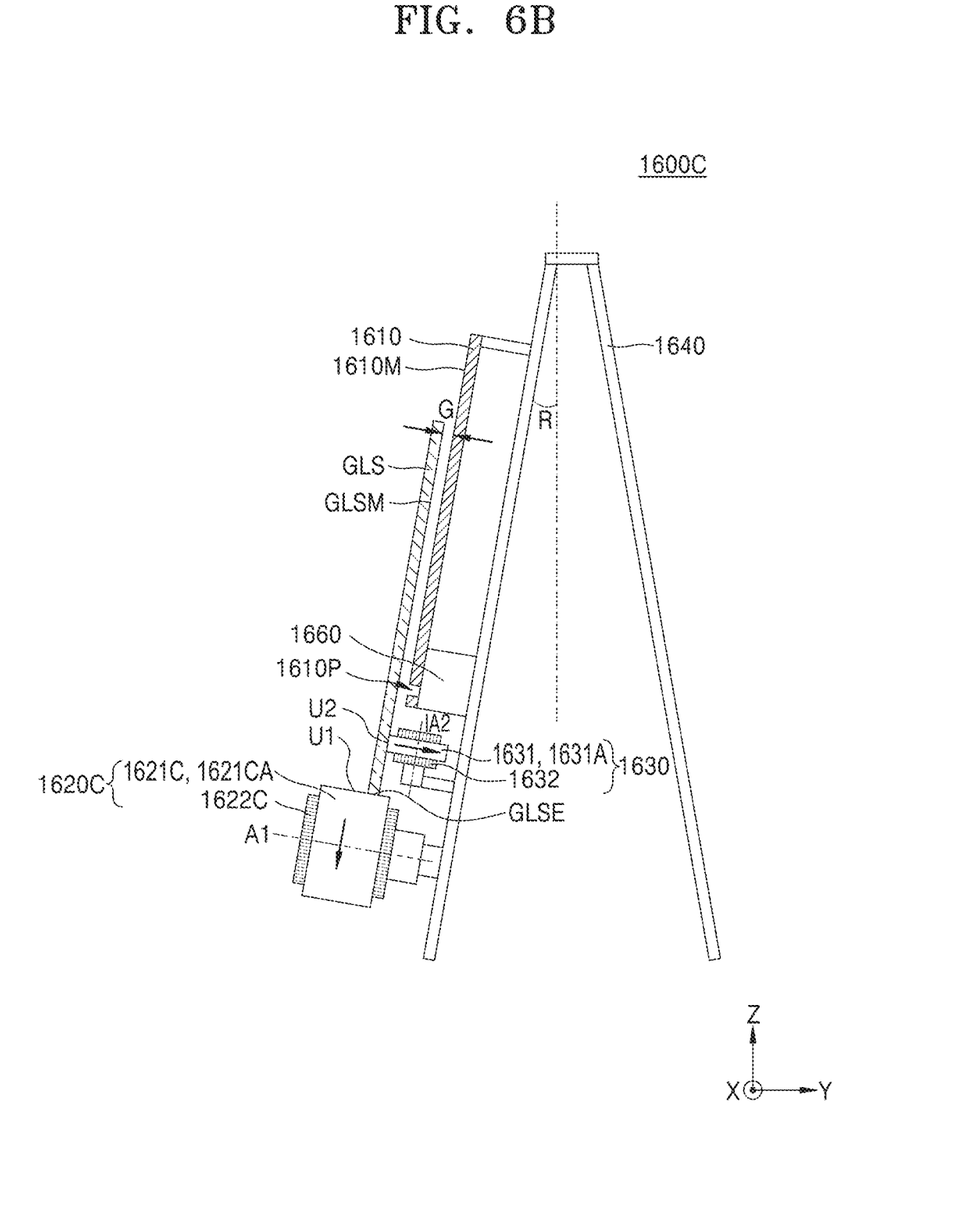

FIGS. 6A and 6B are side views of a glass transportation apparatus 1600C according to an embodiment of the disclosure. Hereinafter, differences between the glass transportation apparatus 1600C shown in FIGS. 6A and 6B and the glass transportation apparatus 1600 shown in FIGS. 3A and 3B will be described below.

Referring to FIGS. 6A and 6B, the glass transportation apparatus 1600C may include the plate 1610, a first conveyer 1620C, and a second conveyer 1630. The first conveyer 1620C may include a first belt 1621C having the upper surface U1 in contact with the edge surface GLSE of the glass pane GLS and a plurality of first pulleys 1622C for circulation of the first belt 1621C. The second conveyer 1630 may include a second belt 1631 having an upper surface U2 in contact with the main surface GLSM of the glass pane GLS and a plurality of second pulleys 1632 for circulation of the second belt 1631. In some embodiments, the second conveyer 1530 may be located between the first conveyer 1620C and the plate 1610. In the specification, the second conveyer 1630 may be also referred to as a side conveyer.

Some of the plurality of first pulleys 1622C, for example, a first pulley at the front end position and a first pulley at the rear end position are driven by a motor, and the other first pulleys 1622C may support the first belt 1621C in an idle state. Similarly, some of the plurality of second pulleys 1632, for example, a second pulley at the front end position and a second pulley at the rear end position, are driven by a motor, and the other second pulleys 1632 may support the second belt 1631 in an idle state. Each of the first pulleys 1622C may rotate about a first rotation axis A1 and each of the second pulleys 1632 may rotate about a second rotation axis A2. The first belt 1621C and the second belt 1631 may include a soft material such as rubber in order to prevent the damage to the glass pane GLS. The first belt 1621C may not include a protrusion as shown in FIGS. 6A and 6B, or may include the protrusion P2 as shown in FIGS. 3A and 3B, or may include the protrusions P3 as shown in FIGS. 5A and 5B.

The first conveyer 1620C and the second conveyer 1630 may transport the glass pane GLS in the X direction. In some embodiments, a transportation speed of the first conveyer 1620C may be equal to that of the second conveyer 1630. The first belt 1621C and the second belt 1631 may be timing belts 1621CA, 1631A, respectively, each having teeth that are engaged with the plurality of first pulleys 1622C and the plurality of second pulleys 1632, respectively, such that the transportation speed of the first conveyer 1620C is equal to that of the second conveyer 1630.

In the related art, the transportation of the glass pane GLS is performed by using side wheels in contact with the main surface of the glass pane GLS. However, according to the glass transportation apparatus 1600C of the embodiment of the disclosure, the side conveyer 1630 is used instead of using the side wheels, and thus, damage, breakage, or falling down of the glass pane GLS due to trapping of the glass pane GLS between the side wheels may be prevented, and also damage or breakage of the glass pane GLS due to contact with the side wheels may be prevented.

In some embodiments, the upper surface U1 of the first belt 1621C may be perpendicular to the main surface 1610M of the plate 1610, and the upper surface U2 of the second belt 1631 may be parallel to the main surface 1610M of the plate 1610. The angle adjustment device 1640 may adjust angles of the main surface 1610M of the plate 1610, the upper surface U1 of the first belt 1621C, and the upper surface U2 of the second belt 1631 with respect to the gravity direction (−Z direction) by adjusting the angle R.

The embodiments of the disclosure are intended to illustrate and not limit the technical spirit of the disclosure, and the scope of the technical idea of the disclosure is not limited by these embodiments. The scope of the disclosure is to be interpreted by the following claims, and all technical ideas which are within the scope of the equivalence should be interpreted as being included in the scope of the right.

What is claimed is:

1. A glass transportation apparatus comprising:
   a plate comprising a main surface facing a main surface of a glass pane;
   a gas blowing device coupled to the plate, the device comprising at least one opening and configured to blow a gas through the at least one opening towards the main surface of the glass pane such that the main surface of the glass pane is spaced apart from the main surface of the plate;
   a conveyer comprising a belt having an upper surface and a plurality of pulleys configured to circulate the belt, the upper surface of the belt being perpendicular to the main surface of the plate and configured to be in contact with an edge surface of the glass pane; and
   a sensor configured to sense a weight and/or a thickness of the glass pane fed into the glass transportation apparatus,
   wherein the gas blowing device is configured to adjust a flow rate of the gas to be a first flow rate when the glass pane is an outer glass pane based on the weight and/or the thickness sensed by the sensor, and
   the gas blowing device is configured to adjust the flow rate of the gas to be a second flow rate when the glass pane is an inner glass pane that is thinner than the outer glass pane based on the weight and/or the thickness sensed by the sensor, the second flow rate being less than the first flow rate.

2. The glass transportation apparatus of claim 1, wherein the flow rate is adjusted according to an order of feeding the glass panes into the glass transportation apparatus.

3. The glass transportation apparatus of claim 1, wherein the glass transportation apparatus does not comprise a wheel configured to contact with the main surface of the glass pane.

4. The glass transportation apparatus of claim 1, wherein the belt comprises a base portion having the upper surface that is flat, and a protrusion protruding from the upper surface of the base portion and configured to be in contact with the main surface of the glass pane.

5. The glass transportation apparatus of claim 1, further comprising a side conveyer comprising a belt and a plurality of pulleys for circulating the belt, the belt configured to be in contact with the main surface of the glass pane.

6. The glass transportation apparatus of claim 1, wherein the main surface of the plate is inclined 8° to 14° with respect to a gravity direction.

7. The glass transportation apparatus of claim 1, wherein the sensor is configured to only sense the weight of the glass pane fed into the glass transportation apparatus.

8. A glass transportation apparatus comprising:
   a plate comprising a main surface facing a main surface of a glass pane;
   a gas blowing device coupled to the plate, the device comprising at least one opening and configured to blow a gas through the at least one opening towards the main surface of the glass pane such that the main surface of the glass pane is spaced apart from the main surface of the plate;
   a conveyer comprising a belt having an upper surface and a plurality of pulleys configured to circulate the belt, the upper surface of the belt being perpendicular to the main surface of the plate and configured to be in contact with an edge surface of the glass pane;
   an angle adjustment device coupled to the plate and configured to adjust the plate to define an angle between the main surface of the plate and a gravity direction; and
   a sensor configured to sense a weight and/or a thickness of the glass pane fed into the glass transportation apparatus,
   wherein the angle adjustment device is configured to adjust the angle between the main surface of the plate and the gravity direction to be a first angle when the glass pane is an outer glass pane based on the weight and/or the thickness sensed by the sensor, and the angle adjustment device is configured to adjust the angle between the main surface of the plate and the gravity direction to be a second angle when the glass pane is an inner glass pane that is thinner than the outer glass pane based on the weight and/or the thickness sensed by the sensor, the second angle being greater than the first angle.

9. The glass transportation apparatus of claim 8, wherein the angle is adjusted according to an order of feeding the glass panes into the glass transportation apparatus.

10. The glass transportation apparatus of claim 8, wherein the first angle is 5° to 8°, and the second is 8° to 14°.

11. The glass transportation apparatus of claim 8, wherein the sensor is configured to only sense the weight of the glass pane fed into the glass transportation apparatus.

12. A glass transportation apparatus comprising:
a plate comprising a main surface facing a main surface of a glass pane;
a first conveyer comprising a first belt having an upper surface and a plurality of first pulleys configured to circulate the first belt, the upper surface of the first belt being provided to be in contact with an edge surface of the glass pane; and
a second conveyer comprising a second belt having an upper surface and a plurality of second pulleys configured to circulate the second belt, the upper surface of the second belt configured to be in contact with the main surface of the glass pane,
wherein the first belt comprises a base portion having the upper surface that is flat, and a protrusion protruding from the upper surface of the base portion and configured to be in contact with the main surface of the glass pane.

13. The glass transportation apparatus of claim 12, wherein a transportation speed of the first conveyer is equal to a transportation speed of the second conveyer.

14. The glass transportation apparatus of claim 12, wherein the first conveyer and the second conveyer each comprise a timing belt.

15. The glass transportation apparatus of claim 12 wherein the second conveyer is located between the first conveyer and the plate.

16. The glass transportation apparatus of claim 12, wherein
the upper surface of the first belt is perpendicular to the main surface of the plate, and
the upper surface of the second belt is in parallel with the main surface of the plate.

17. The glass transportation apparatus of claim 12, further comprising an angle adjustment device coupled to the plate and configured to adjust the plate to define angles formed by the main surface of the plate, the upper surface of the first belt, and the upper surface of the second belt with respect to a gravity direction.

18. The glass transportation apparatus of claim 12, further comprising a gas blowing device coupled to the plate, the device comprising at least one opening and configured to blow a gas through the at least one opening towards the main surface of the glass pane such that the main surface of the glass pane is spaced apart from the main surface of the plate.

19. The glass transportation apparatus of claim 18, wherein the gas blowing device is configured to blow the gas towards the main surface of the glass pane through an opening in the plate.

20. A system for manufacturing a multi-pane glass unit, the system comprising:
a pressing apparatus configured to attach an inner glass pane to a first outer glass pane via a first spacer and attach a second outer glass pane to the inner glass pane via a second spacer, the inner glass pane being thinner than the first outer glass pane and the second outer glass pane; and
a glass transportation apparatus according to claim 1 the glass transportation apparatus configured to transport the first outer glass pane, the inner glass pane, and the second outer glass pane sequentially to the pressing apparatus.

* * * * *